(12) United States Patent
Hung et al.

(10) Patent No.: US 8,190,810 B2
(45) Date of Patent: May 29, 2012

(54) NON-VOLATILE MEMORY APPARATUS AND METHOD FOR ACCESSING A NON-VOLATILE MEMORY APPARATUS

(75) Inventors: Chi-Hsiang Hung, Hsin-Dien (TW); Hsiao-Chun Pan, Hsin-Dien (TW); Wu-Chi Kuo, Hsin-Dien (TW)

(73) Assignee: Silicon Motion, Inc., Jhubei (TW)

( * ) Notice: Subject to any disclaimer, the term of this patent is extended or adjusted under 35 U.S.C. 154(b) by 700 days.

(21) Appl. No.: 12/105,407

(22) Filed: Apr. 18, 2008

(65) Prior Publication Data
US 2009/0265503 A1    Oct. 22, 2009

(51) Int. Cl.
*G06F 12/00* (2006.01)
(52) U.S. Cl. ........................... 711/103; 711/156
(58) Field of Classification Search .................. None
See application file for complete search history.

(56) References Cited

U.S. PATENT DOCUMENTS

| | | | | |
|---|---|---|---|---|
| 6,570,785 | B1 * | 5/2003 | Mangan et al. | 365/185.02 |
| 7,177,977 | B2 * | 2/2007 | Chen et al. | 711/103 |
| 7,778,078 | B2 * | 8/2010 | Nagadomi et al. | 365/185.09 |
| 2008/0288814 | A1 * | 11/2008 | Kitahara | 714/5 |

FOREIGN PATENT DOCUMENTS
CN    101226504    7/2008

OTHER PUBLICATIONS

Office Action from corresponding Chinese Publication No. 200810127373X dated Jun. 7, 2010. English machine translation attached.

* cited by examiner

*Primary Examiner* — Gary Portka
(74) *Attorney, Agent, or Firm* — Grossman, Tucker, Perreault & Pfleger, PLLC

(57) ABSTRACT

A non-volatile memory apparatus and a method for accessing the non-volatile memory apparatus are provided. The non-volatile memory apparatus comprises a management unit, a look-up table and a controller. The management unit comprises a plurality of data blocks and a plurality of spare blocks. The look-up table is adapted to record the read status of the management unit. The controller is configured to read the management unit and then generate the read status denoting the times that the management unit has been read to the look-up table, and to replace one of the data blocks by one of the spare blocks in response to the read status when the times that the management unit has been read exceeds a reference value.

16 Claims, 3 Drawing Sheets

NON-VOLATILE MEMORY APPARATUS AND METHOD FOR ACCESSING A NON-VOLATILE MEMORY APPARATUS

CROSS-REFERENCES TO RELATED APPLICATIONS

Not applicable.

BACKGROUND OF THE INVENTION

1. Field of the Invention

The present invention relates to a non-volatile memory apparatus. More particularly, the present invention relates to a non-volatile memory apparatus configured to prevent from read disturb and an accessing method thereof.

2. Descriptions of the Related Art

Non-volatile memories are widely used in many digital products such as mobile phones, personal computers, MP3 players, PDAs (personal digital assistant) and digital cameras. However, there are some limitations due to the natural characteristics of non-volatile memories. For example, a flash memory may repeatedly read the same block in the flash memory when data stored in the flash memory is static, that is, not erased or moved. Since the block is mainly constituted by a plurality of transistors, once the block is in static situation, the electric potential voltage on the floating gate of a transistor would vary. For a NAND flash memory, the electric potential voltage would increase when the block is static for a long time. More particularly, for a NAND flash memory, electrons flow out of the floating gate when the NAND flash memory is read, causing an increase in the electric potential voltage. In other words, the various electric potential voltages may have an error when the block is read again. The aforementioned phenomenon is denoted as a read disturb, and the flash memory cannot be read correctly. Moreover, the data may be lost and cannot be retrieved anymore.

Thus, it is important to modify data blocks that are read extortionately to prevent read disturb.

SUMMARY OF THE INVENTION

The primary objective of this invention is to provide a non-volatile memory apparatus, which comprises a management unit, a look-up table and a controller. The management unit comprises a plurality of data blocks and a plurality of spare blocks. The look-up table is adapted to record the read status of the management unit. The controller is configured to read the management unit and then generate the read status denoting a number of times that the management unit has been read to the look-up table. The controller activates to replace the data blocks with spare blocks in response to the read status when the number of times that the management unit has been read exceeds the reference value.

Another objective of this invention is to provide a method for accessing a non-volatile memory apparatus. The non-volatile memory apparatus comprises a plurality of management units having a plurality of data blocks and a plurality of spare blocks. The method comprises the steps of: generating a read status by reading the management unit, in which the read status denotes a number of times that the management unit has been read; replacing one of the data blocks by one of the spare blocks in response to the read status when the number of times that the management unit has been read exceeds a reference value.

With this arrangement, the present invention is capable of decreasing the number of times that the same data block in the management unit has been read to avoid read disturb.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention provides a non-volatile memory apparatus and method for accessing the non-volatile memory apparatus. When the number of times that one data block has been read reaches to a reference value, the data block is replaced by one spare block by means of using wear-leveling.

Figure 1:
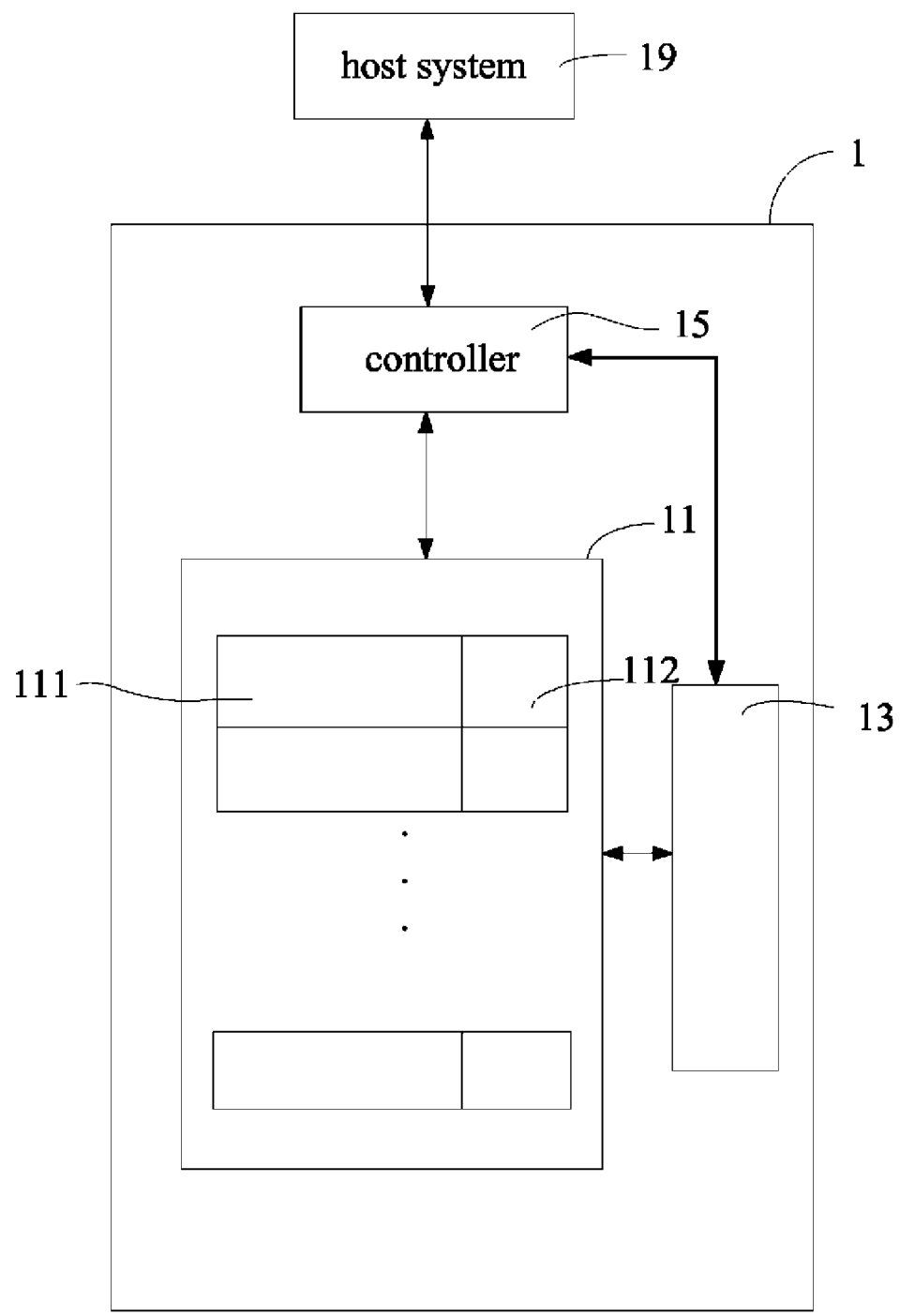
FIG. 1 is a block diagram illustrating a non-volatile memory apparatus of the present invention.

FIG. 1 is a block diagram illustrating a non-volatile memory apparatus 1 of the present invention, in which the non-volatile memory apparatus 1 is connected to a host 19 via an interface, such as a universal serial bus (USB). The non-volatile memory apparatus 1 comprises a management unit 11, a look-up table 13 and a controller 15. The management unit 11 comprises a plurality of data blocks 111 and a plurality of spare blocks 112. The look-up table 13 is adapted to record a read status of the management unit 11. The controller 15 reads the management unit 11 when it receives a command from the host 19, then the controller 15 generates the read status denoting a number of times that the management unit 11 has been read, and stores the read status in the look-up table 13.

The read status indicates read count of the management unit 11. When the number of times that the management unit 11 has been read exceeds a reference value, the controller 15 would replace one of the data blocks 111 by one of the spare blocks 112 in response to the read status. More particularly, the read status may indicate kinds of read count, for example, the read status indicates a gross read count denoting a number of times that the data blocks have been read, a particular read count denoting one data block which has latest been read. As the gross read count increases, the management unit 11 needs to be wear-leveled. When the gross read count exceeds a reference value, it means the management unit 11 has been read a certain number of times, and the controller 15 proceeds the weal-leveling to the management unit 11 to replace the data block which has latest been read by one spare block. Then the controller 15 re-calculates the gross read count after the wear-leveling. Since the data block has been replaced by one spare block, the spare block now maps to the logical address of the data block for continuously maintaining the data and preventing from data lose due to read disturb.

The gross read count varies as the non-volatile memory apparatus operates, whenever any one of the data blocks is continuously read, the controller 15 adds one on the gross read count, and whenever any one of the data blocks is written, the controller 15 subtract one from the gross read count. The mechanism is designed based on characters of the non-volatile memory apparatus. For example, writing operation of the non-volatile memory apparatus can re-distribute the internal electric potential voltage, and the non-volatile has to erase a written block before updating new data into the written block, the updating operation also can re-distribute the internal electric potential voltage. The characters can help in preventing read disturb when writing operation occurs.

The controller 15 can also proceed the wear-leveling to the management unit 11 in other way. The look-up table 13 can be configured to record a particular read count denoting a number of times that each data block has been read. Refer to the previous example, the look-up table 13 needs larger capability for recording each data block. Once the look-up table 13 records the number of times that each data block has been read, the controller 15 can proceed the wear-leveling to replace one data block that has the largest particular read count by one spare block, when the gross read count exceeds the reference value. That is, the controller 15 can proceed the wear-leveling in accordance with the data block that needs to be replaced most.

The present invention aims at replacing the data block that has been read extortionately to prevent read disturb, thus the read status is brought up for indicating the gross read count and the particular read count. A detailed description of the look-up table 13 is described in below. In this example, the look-up table 13 occupies 1024 bits corresponding to 1024 data blocks of the management unit 11, the bits are configured to manage the read status of the data blocks 111. Since one bit can present two statuses, "0" and "1", digitally, each data block is tagged with two read flags by one corresponding bit. Once one data block is read, its read flag would be set into "1", and once one data block is written/programmed or erased, its read flag would be set into "0". When any read flag is set into "1", the controller 15 adds one on the gross read count, and similarly, when any read flag is set into "0", the controller 15 subtracts one from the gross read count. The controller 15 reads the look-up table 13 from time to time to check the read status of the management unit 11. If the look-up table 13 occupies more bits, it can record more different status of corresponding data blocks. For example, if the look-up table 13 occupies 4096 bits corresponding to 1024 data blocks, the look-up table 13 can mostly record sixteen different statuses of each data blocks. Also, the look-up table 13 can be a part of the management unit 11, that is, the look-up table 13 can be integrated with the management unit 11 and be manufactured together. People skilled in the art can understand that the capability of the look-up table 13 and the formality of the look-up table 13 are not limitations of the present invention.

Figure 2:
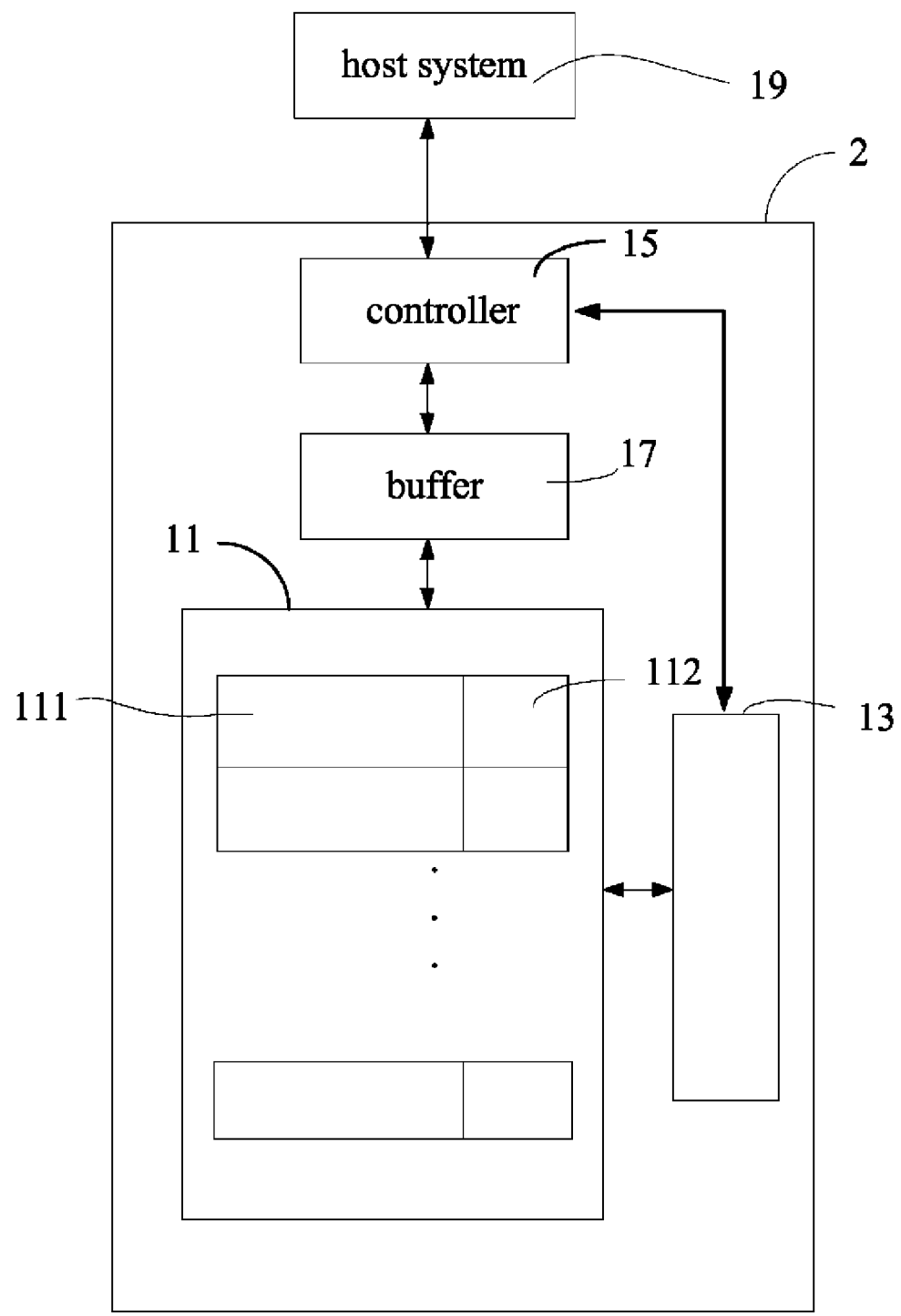
FIG. 2 illustrates the variation apparatus in accordance with FIG. 1.

FIG. 2 illustrates another embodiment of the present invention. The main different is that the non-volatile memory apparatus 2 in FIG. 2 further comprises a buffer 17 connected between the controller 15 and the management unit 11. The buffer 17 is configured to buffer the data transmission between the controller 15 and the management unit 11 increasing efficiency for read data or write data. As for the connection relationship of other devices is the same as FIG. 1. It is not necessarily to describe in detail herein.

Figure 3:
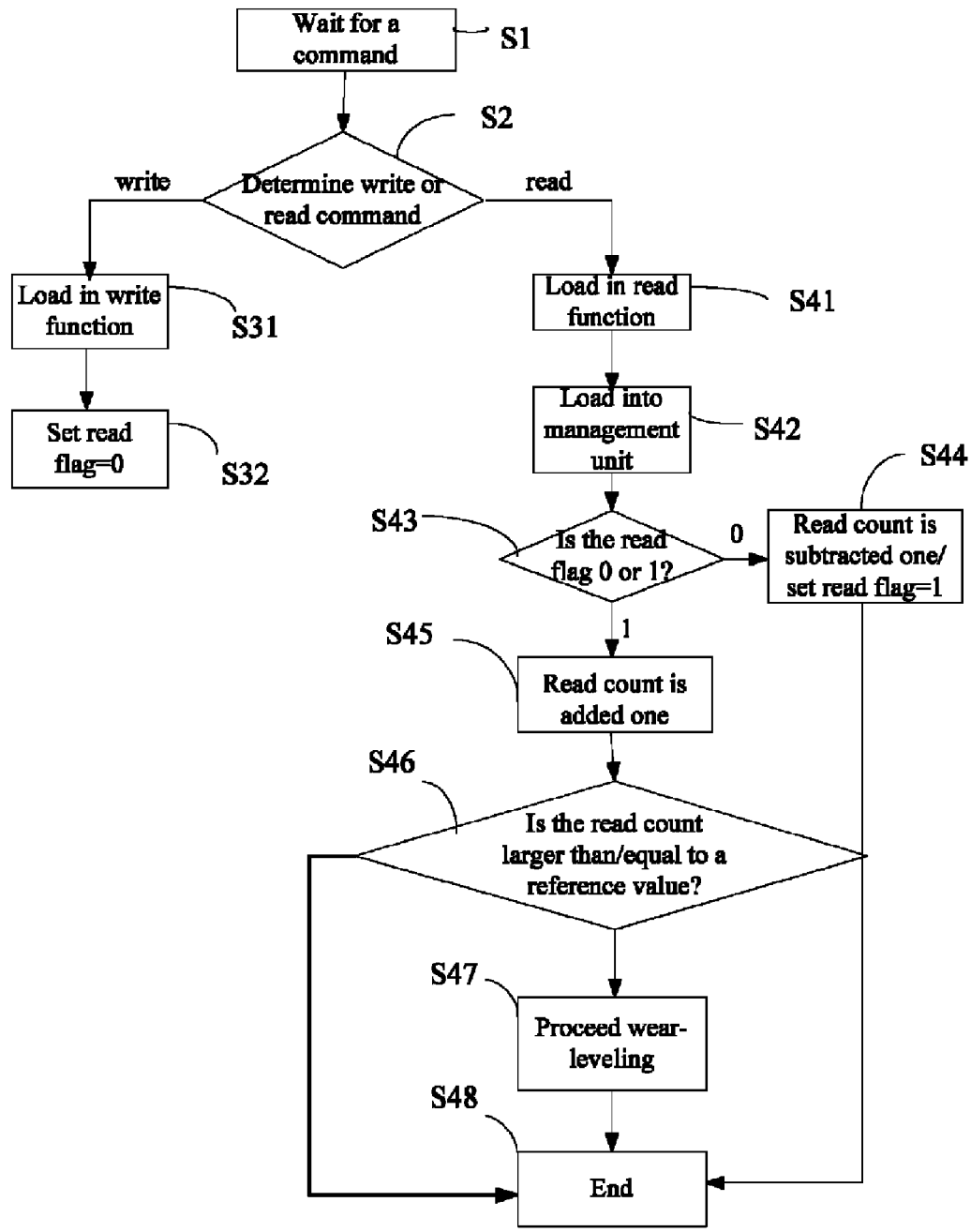
FIG. 3 is a flow chart illustrating the method for accessing a non-volatile memory apparatus.

FIG. 3 is a flow chart illustrating the method for accessing a non-volatile memory apparatus according to the embodiment of the present invention. The method can be applied in the aforementioned embodiments. In general, the method comprising the steps of: generating a read status by reading the management unit 11, in which the read status denotes a number of times that the management unit 11 has been read; and proceeding a wear-leveling to the management unit 11 to replace one of the data blocks 111 by one of the spare blocks 112 in response to the read status when the number of times that the management unit 11 has been read exceeds a reference value.

The detailed description of this present invention is as follows. In FIG. 3, the first step of the method is step S1. Step S1 denotes the controller 15 waiting a command from the host 19. If the command is a write command, then the step S31 and S32 will be processed. The step S31 is configured to execute a write function, and the step S32 is configured to execute the controller 15 to set the read flag "0".

However, if the command is a read command, then the step S41 is processed. Step S41 is configured to execute a read function, after which the read function is loaded into the management unit 11 (step S42.) After completing step S42, the controller 15 may determine whether the read flag is "1" or "0" in step S43. The read flag is set into "0" when the data block 111 is written, and set to "1" when the data block 111 is read. If the read flag is set into "1", step S45 is executed to generate the read status by reading the management unit 11. The particular read count of one data block which has been last read. Whenever the data block 111 is continuously read, i.e. read flag is 1, one more count is added to the gross read count. In step S46, when the count of the data block 111 has reached the reference value, the controller 15 activates the wear-leveling to the management unit 11 to replace one of the data blocks 111 with one of the spare blocks 112 in step S47. Furthermore, when the data block 111 is continuously read so that the gross read count exceeds the reference value, the controller 15 activates the wear-leveling to the management unit 11 to replace one of the data blocks 111 with one of the spare blocks 112 in step S47. Finally, step S48 completes the wear-leveling in accordance with step S45 to step S47.

If the read flag is determined to be "0" in step S43, another read status is generated by reading the management unit 11. Another read status provides a gross read count denoting a number of times that the data block 111 have been read and a particular read count of one data block which has been last read by reading the data block 111 of the management unit 11. The step of generating the read status is step S44. Whenever the data block 111 was written, i.e. read flag is 0, a count is subtracted from the gross read count and the controller 15 sets the read flag to 1. Obviously, it is difficult to exceed the reference value or to be equal to the reference value in step S44. Therefore, it is not necessary to activate the wear-leveling, and step S48 is executed to end the operation.

Accordingly, further embodiments and variations from step S43 to step S47 are described below. The read status provides a gross read count denoting the number of times that the management unit 11 has been read and a particular read count denoting the number of times that each data block 111 has been read by reading each data block 111 of the management unit 11. When the gross read count exceeds the reference value, step S47 is executed to make the controller 15 activate the wear-leveling to replace the data block 111 which has been read last by one spare block 112. Alternatively, when the gross read count exceeds the reference value, step S47 is executed to make the controller 15 activate the wear-leveling to replace the data block 111 that has the largest particular read count by one spare block 112. Finally, step S48 is executed to end the wear-leveling.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A non-volatile memory apparatus, comprising:
a management unit, comprising a plurality of data blocks and a plurality of spare blocks; a look-up table, comprising a plurality of read flags and being adapted to record a read status of the management unit, each of the data blocks being tagged with one of the read flags; and
a controller, being configured to read the management unit and then generate the read status denoting a number of times that the management unit has been read to the look-up table, to determine any one of the data blocks is continuously read according to the read flags, to add one on a gross read count whenever any one of the data blocks is continuously read, and to replace one of the data blocks by one of the spare blocks in response to the read status when the number of times that the management unit has been read exceeds a reference value;
wherein the read status relates to the gross read count denoting a number of times that the data blocks have been read.

2. The non-volatile memory apparatus as claimed in claim 1, wherein the read status further relates to a particular read count denoting one data block which has latest been read.

3. The non-volatile memory apparatus as claimed in claim 2, wherein the controller proceeds to replace the data block which has latest been read by one spare block when the gross read count exceeds the reference value.

4. The non-volatile memory apparatus as claimed in claim 2, wherein the controller is configured to subtract one from the gross read count whenever any one of the data blocks is written/programmed by the controller.

5. The non-volatile memory apparatus as claimed in claim 1, wherein the read status relates to a particular read count denoting a number of times that each data block has been read.

6. The non-volatile memory apparatus as claimed in claim 5, wherein the controller proceeds to replace one data block which has latest been read by one spare block when the gross read count exceeds a reference value.

7. The non-volatile memory apparatus as claimed in claim 5, wherein the controller proceeds to replace one data block that has the largest particular read count by one spare block when the gross read count exceeds a reference value.

8. The non-volatile memory apparatus as claimed in claim 5, wherein the controller is configured to subtract one from the gross read count whenever any one of the data blocks is written/programmed by the controller.

9. A method for accessing a non-volatile memory apparatus, the non-volatile memory apparatus comprises a plurality of management units having a plurality of data blocks and a plurality of spare blocks, the method comprising the steps of:
defining a plurality of read flags;
tagging each of the data blocks with one of the read flags;
generating a read status by reading the management unit, in which the read status denotes a number of times that the management unit has been read;
determining any one of the data blocks is continuously read according to the read flags;
adding one on a gross read count whenever any one of the data blocks is continuously read; and
replacing one of the data blocks by one of the spare blocks in response to the read status when the number of times that the management unit has been read exceeds a reference value;
wherein the read status relates to the gross read count denoting a number of times that the data blocks have been read.

10. The method as claimed in claim 9, wherein the read status further relates to a particular read count denoting one data block which has latest been read.

11. The method as claimed in claim 10 wherein the replacing step comprises:
replacing the data block which has latest been read by one spare block when the gross read count exceeds the reference value.

12. The method as claimed in claim 10, wherein the generating step comprises:
subtracting one from the gross read count whenever any one of the data blocks is written/programmed.

13. The method as claimed in claim 9, wherein the read status relates to a particular read count denoting a number of times that each data block has been read.

14. The method as claimed in claim 13, wherein the replacing step comprises:
replacing the data block which has latest been read by one spare block when the gross read count exceeds the reference value.

15. The method as claimed in claim 13, wherein the replacing step comprises:
replacing the data block that has the largest particular read count by one spare block when the gross read count exceeds the reference value.

16. The method as claimed in claim 13, wherein the generating step comprises:
subtracting one from the gross read count whenever any one of the data blocks is written/programmed.

* * * * *